United States Patent [19]

Frohmader

[11] 4,042,358
[45] Aug. 16, 1977

[54] FILTER MEDIA
[75] Inventor: Stanley H. Frohmader, Madison, Wis.
[73] Assignee: Research Products Corporation, Madison, Wis.
[21] Appl. No.: 686,386
[22] Filed: May 14, 1976
[51] Int. Cl.² .............................................. B01D 46/52
[52] U.S. Cl. ........................................ 55/497; 55/509; 55/521; 210/493 FR
[58] Field of Search ................. 55/491, 497, 498, 499, 55/500, 509, 521; 210/493 R, 493 FR; 428/102, 131; 112/427

[56] References Cited
U.S. PATENT DOCUMENTS

| 2,117,240 | 5/1938 | Cohon | 428/131 |
|---|---|---|---|
| 2,423,741 | 7/1947 | Vokes et al. | 55/491 |
| 3,227,592 | 1/1966 | Coates et al. | 55/499 |
| 3,458,979 | 8/1969 | Davis | 55/499 |
| 3,474,599 | 10/1969 | Schwab | 55/521 |
| 3,789,589 | 2/1974 | Delaney et al. | 55/500 |

FOREIGN PATENT DOCUMENTS

| 1,000,957 | 1/1957 | Germany | 112/427 |

Primary Examiner—Frank W. Lutter
Assistant Examiner—David L. Lacey
Attorney, Agent, or Firm—Andrus, Sceales, Starke & Sawall

[57] ABSTRACT

An air filter is formed into an accordion-shaped body having reverse folds forming pockets. A plurality of string-like pleat spacing members are provided and with each member being threaded through a plurality of openings in the pocket walls. The openings are smaller in diameter than that of the spacing member when it is in a relaxed condition to provide a friction force fixedly holding the pocket walls in place along the member.

7 Claims, 8 Drawing Figures

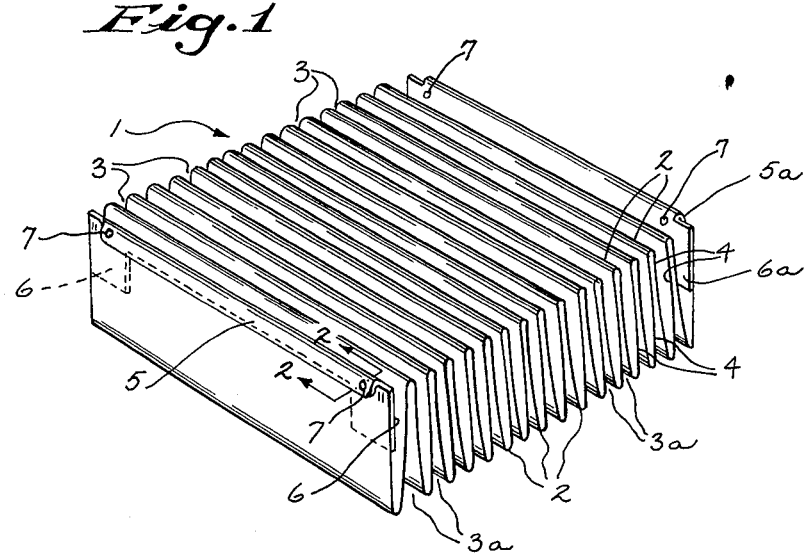
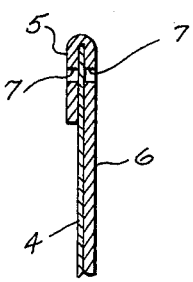
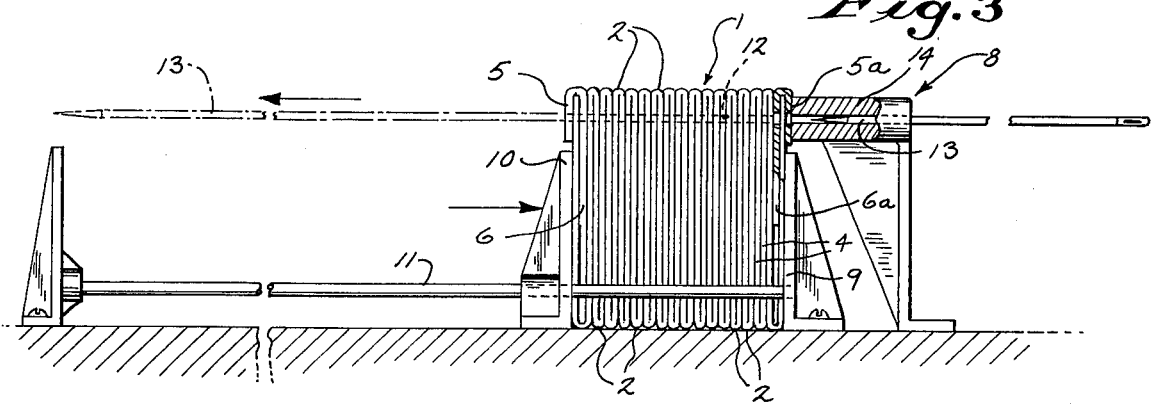
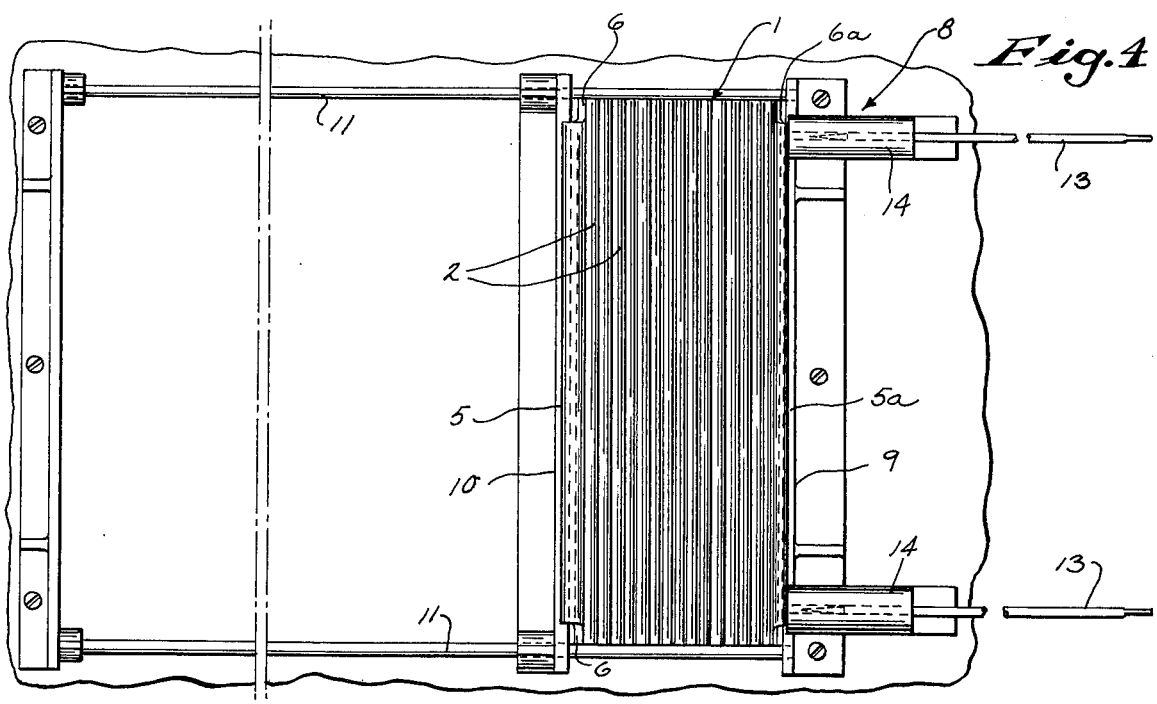

FILTER MEDIA

PRIOR ART OF INTEREST

Davis U.S. Pat. No. 3,458,979 Aug. 5, 1969
Delaney et al U.S. Pat. No. 3,789,589 Feb. 5, 1974

BACKGROUND AND SUMMARY OF THE INVENTION

This invention relates to filter media, and is directed particularly to expandible accordian-shaped filters which may be used in air filtration systems of the high efficiency type. An example of such a system is disclosed in the above-identified U.S. Pat. No. 3,789,589.

In that patent, the air filter comprises a self-supporting body of suitable material such as paper or other fibrous material. The body is reverse folded into an accordian-shaped member. The body may be collapsed into a small volume for ease of shipping and disposal. It may also be expanded for insertion into a supporting assembly which includes a plurality of fingers for holding the pleats against collapse.

As also disclosed in that patent, a spaced pair of narror strips of cloth or the like extend across the end portions of the filter body with the strips being secured to the pleat folds in a manner so that, when the body is expanded, the pockets are of a uniform width.

It has been found that the securement means between the strips and pleat folds, which was usually in the form of an adhesive, was not completely reliable. Separation of the strip from some of the folds has caused difficulties in installing the filter media into its support assembly and in the placement of the supporting fingers.

The present invention is directed to a substantially improved media wherein the previous type of spacing strip is replaced with an elongated string-like member which passes through a series of openings formed in the pleat walls. The openings are smaller in diameter than that of the elongated member when the latter is in a relaxed condition so that friction between the opening edges and the member fixedly holds the pleat walls in position along the member. The positioning of the walls on the member is such that the folds will be equally spaced when the filter body is in expanded condition. In a preferred form of the invention, the string-like member comprises one or more strands of fluffy yarn which is easily variable, both in diameter and length.

BRIEF DESCRIPTION OF THE DRAWINGS

The accompanying drawings illustrate the best mode presently contemplated by the inventor for carrying out the invention.

In the drawings:

FIG. 1 is a perspective view of an accordian-shaped air filter body in expanded condition;

FIG. 2 is an enlarged horizontal section taken on line 2—2 of FIG. 1;

FIG. 3 is a side elevation showing the collapsed filter body suitably supported and with the series of openings being formed;

FIG. 4 is a top plan view of the arrangement of FIG. 3;

DESCRIPTION OF THE PREFERRED EMBODIMENT

Figure 5:
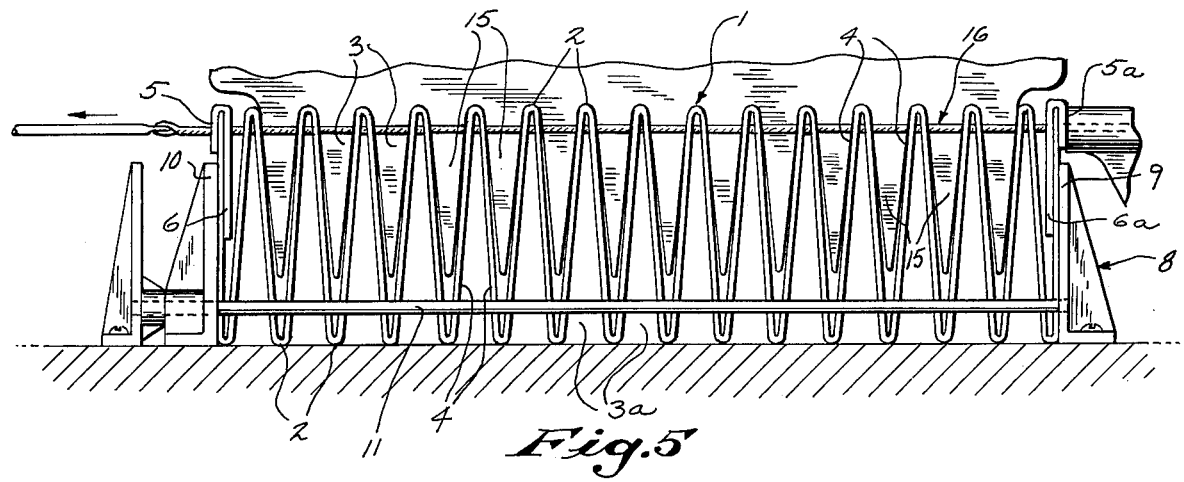
FIG. 5 is a side elevational view showing the expanded filter body being threaded with the string-like spacing member.

As shown in FIG. 1, the concept of the invention is adapted for use in connection with an air filter of the same general type disclosed in the previously referred to U.S. Pat. No. 3,789,589. That is, the filter comprises a body 1, preferably of fibrous non-woven material. The filter body is open-ended and provides an extended filtering surface by virtue of the fact that it is reverse folded as at 2 into a collapsible expandible elongated accordian-shaped member forming oppositely facing pockets 3, 3a having common walls 4. As in the aforementioned patent, a narrow reinforcing lip 5, 5a of cardboard or the like folds over the exposed respective front and rear edges of the filter, and a reinforcing tongue or tab 6, 6a is integral with the respective lip and extends downwardly into the end pocket. As best shown in FIG. 2, horizontally alignd openings 7 are formed in the cardboard reinforcemens and are spaced below the top edge of the filter, for purposes to be described.

As previously pointed out, filter body 1 can be collapsed for shipping. However, when it is to be put to use, it is expanded so that its folds 2 are substantially equally spaced and is then mounted in a suitable filter holding assembly, such as disclosed in U.S. Pat. No. 3,789,589.

In accordance with the present invention, a unique device is utilized to limit the expansion of body 1 and hold the pleats or folds in the desired relationship for mounting in the filter assembly. FIGS. 3-5 schematically illustrate the creation of the structure of the invention.

Referring to FIGS. 3 and 4, the filter body 1 of FIG. 1 is collapsed and suitably held as in a jig 8 having a fixed front plate 9 for supporting the front of the filter and a rear plate 10 which is movably mounted on rails 11 for supporting the rear of the filter.

It is first desired to form a plurality of aligned holes or openings 12 in filter body 1 and slightly below folds 2. Two parallel rows of aligned holes are preferably created, with each row being disposed adjacent and along an open end of the filter body. For this purpose, a sharp pointed elongated needle 13 is pushed through the collapsed filter pack at the appropriate positions and may be guided if desired by guide members 14. It has been found that holes 12 of approximately 0.05 diameter are very suitable and needle 13 is therefor preferably of about the same size.

Figure 6:
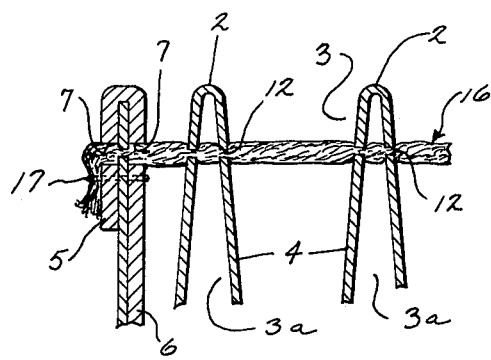
FIG. 6 is an enlarged fragmentary sectional view showing the expanded pleats and friction fit with the spacing member.

Referring to FIG. 5l, filter body 1 is next expanded in the jig and the upper pockets 3 are held in equally spaced apart relationship, as by fingers 15. A string-like member 16 is attached to the trailing end of needle 13 and is threaded through the pre-formed holes 7 and 12 of each row, and then cut off at each end. See FIG. 6. Folds 2 and pockets 3, 3a are thereby equally spaced along member 16.

Member 16 may possibly comprise string, thread, cord or the like. In the preferred form of the invention, one or more strands of 4 ply yarn of acrylic fiber are used. Yarn is fluffy, is easily variable in dimension and its many fibers form a releatively rough outer surface.

The normal unstretched diameter of member 16 is larger than the diameter of holes 12, but because the memer 16 is put under tension during threading, it will be reduced in daimeter sufficiently to pass through the smaller holes. Once the pulling force of threading is removed, member 16 will relax and the portions between pocket walls 4 will expand, leaving the reduced portions in the holes frictionally held by the hole edges. See FIG. 6, which illustrates in greatly enlarged form the frictional clamping of yarn.

The ends of members 16 may be clamped to cardboard lips 5 and tongues 6, as by staples 17.

Figure 7:
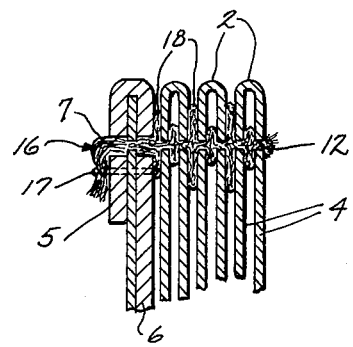
FIG. 7 is an enlarged fragmentary sectional view showing the position of the elements when the filter body is collapsed.
Figure 8:
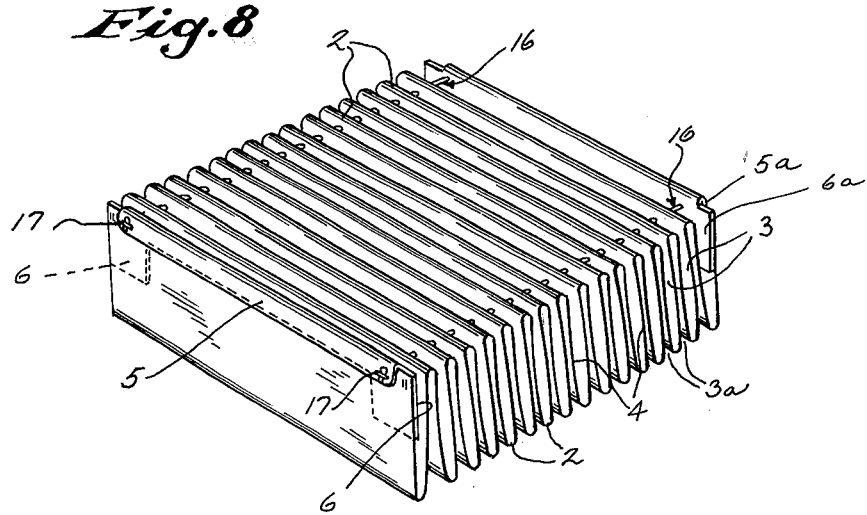
FIG. 8 is a perspective view of the expanded media with the spacing members holding the pleats in place.

When the completed filter is collapsed for shipping, the portions of members 16 between walls 4 will completely relax and, when yarn is employed as in FIG. 7, will form crushed nodules 18 which take up very little space. Subsequently, upon expansion of body 1 for installation purposes, as in FIG. 8, the friction fit between members 16 and walls 4 will fixedly hold the latter in position so that folds 2 and pockets 3, 3a will be substantially equally spaced when members 16 are expended.

The invention provides a relatively simple but effective construction wherein the spacing of the accordian pleats of the filter media is accurately controlled. various modes of carrying out the invention are contemplated as being within the scope of the following claims particularly pointing out and distinctly claiming the subject matter which is regarded as the invention.

I claim:

1. An air filter comprising, in combination:
   a. a collapsible expandable accordian-shaped filter body having reverse folds forming pockets having common walls therebetween,
   b. said walls having at least one row of aligned holes disposed therein,
   c. and an elongated string-like member threaded through said holes and with said string-like member forming means which frictionally engages the edges of said holes so that said walls are fixedly held in place along said member by said frictional engagement when said filter body is expanded.

2. The air filter of claim 1 in which said walls are spaced along said member so that when said filter body is expanded, said folds are equally spaced.

3. The air filter of claim 1 in which:
   a. said holes are smaller in diameter than the normal unstretched diameter of said string-like member,
   b. and the diameter of said member between said walls is larger than the diameter of said holes.

4. The air filter of claim 3 in which said string-like member comprises at least one strand of fluffy, crushable material which is easily variable in diameter.

5. The air filter of claim 4 in which said material has a relatively rough outer surface.

6. The air filter of claim 3 in which the diameter of said holes is about 0.05.

7. An air filter comprising, in combination:
   a. a collapsible expandable accordian-shaped filter body having reverse folds forming pockets having common walls therebetween,
   b. said walls having at least one row of aligned holes disposed therein, the diameter of said holes being about 0.05,
   c. an an elongated string-like member of fluffy crushable relatively rough surfaced material threaded through said holes and with said member frictionally engaging the edges of said holes so that said walls are fixedly held in place along said members in a manner so that when said filter body is expanded, said folds are equally spaced,
   d. said holes being smaller in diameter than the normal unstretched diameter of said member,
   e. and the diameter of said member between said walls being larger than its diameter at said holes when said filter body is in either collapsed or expanded position.

* * * * *